United States Patent [19]

Hockswender et al.

[11] 4,153,586
[45] May 8, 1979

[54] PROCESS OF MAKING EPOXY RESINS MODIFIED WITH MERCAPTOCARBOXYLATES

[75] Inventors: Thomas R. Hockswender, Gibsonia; Marvis E. Hartman, Pittsburgh, both of Pa.

[73] Assignee: PPG Industries, Inc., Pittsburgh, Pa.

[21] Appl. No.: 885,935

[22] Filed: Mar. 13, 1978

[51] Int. Cl.² .............................................. C08L 91/00
[52] U.S. Cl. .................................. 260/18 EP; 528/92; 528/101; 528/109; 528/219; 528/360; 528/374; 528/409; 528/418; 528/421
[58] Field of Search .............. 260/2 EP, 2 EA, 2 EC, 260/2 N, 18 EP, 47 EA, 47 EN, 79; 528/109, 374, 92, 101, 219, 409, 418, 421, 360

[56] References Cited

U.S. PATENT DOCUMENTS

| | | | |
|---|---|---|---|
| 3,412,046 | 11/1968 | Payne | 260/2 EA |
| 4,020,030 | 4/1977 | Harris et al. | 260/47 EP |
| 4,029,621 | 6/1977 | Hartman et al. | 260/47 EC |

*Primary Examiner*—Melvyn I. Marquis
*Attorney, Agent, or Firm*—Charles R. Wilson

[57] ABSTRACT

A process of making modified epoxy resins wherein a polyepoxide resin is reacted with a mercaptan compound of the formula HS—R—(COOX)$_m$ wherein R is an organic radical having from 1 to 10 carbon atoms, X is hydrogen or a moiety formed by reacting the carboxyl group with a basic compound to form its salt and m is an integer of from 1 to 5. The compounds are reacted in the presence of a tin catalyst to produce resins of the structure

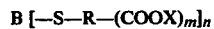

B [—S—R—(COOX)$_m$]$_n$ wherein B is the residue from the ring opening reaction of an epoxide group on the polyepoxide resin molecule and the sulfhydryl hydrogen, R, X and m are as defined previously and n is at least 1. The aforementioned resins are produced without the need of a hydrolysis step.

The modified epoxy resins are useful in formulating coating compositions having excellent physical and chemical properties. The resins can be dissolved or dispersed in water to form aqueous coating compositions.

17 Claims, No Drawings

PROCESS OF MAKING EPOXY RESINS MODIFIED WITH MERCAPTOCARBOXYLATES

BACKGROUND OF THE INVENTION

This invention relates to a process of making modified epoxy resins utilizing a polyepoxide and a mercapto compound. More particularly, this invention relates to a process of making modified epoxy resins via a one-step process.

Epoxy-containing coating compositions are extensively used. Such coating compositions typically contain an organic solvent having the epoxy resin dissolved therein. However, because of concerns as to potential air pollution caused by the solvents in the compositions, a considerable effort has been expended in producing aqueous epoxy-containing coating compositions. Such compositions are either organic solvent free or have had the level of such solvents substantially reduced. Prior attempts to develop water-soluble or water-dispersible epoxy resins have involved reacting the epoxy resin with hydroxy carboxylic acids. Unfortunately, the resultant products have normally been a mixture of different compounds not possessing suitable properties.

U.S. Pat. No. 4,029,621, Hartman et al, issued June 14, 1977 discloses a process of making modified epoxy resins. The described process involves reacting an epoxy resin with a compound containing a mercaptan group and at least one group hydrolyzable to a carboxyl group. The disclosed process includes an hydrolysis step to provide resins with the desired carboxyl functionality which is used for subsequent solubilization. While the resultant products of the U.S. Pat. No. 4,029,621 do possess desirable properties, the described process of making them requires multiple steps and is, for this reason, somewhat cumbersome.

It has now been found modified epoxy resins of the type described in U.S. Pat. No. 4,029,621 can be produced without the necessity of a hydrolysis step. The reaction of a polyepoxide with a mercaptan compound of the formula HS—R—(COOX)$_m$ wherein R is an organic radical and X is hydrogen or a moiety formed by reacting a carboxylic group with a basic compound and m is an integer of from 1 to 5 in the presence of a tin catalyst leads to the desired resins without the need of an hydrolysis step.

As used herein all percentages and ratios are by weight unless otherwise indicated.

SUMMARY OF THE INVENTION

A process of making modified epoxy resins comprising the step of reacting in the presence of a tin catalyst a polyepoxide having a 1,2-epoxy equivalency of greater than 1.0 with a mercaptan compound having the structure HS—R—(COOX)$_m$ wherein R is an organic radical having from 1 to 10 carbon atoms, X is hydrogen or a moiety formed by reacting the carboxylic group with a basic compound to form its salt and m is an integer of from 1 to 5 so as to make resins represented by the structure

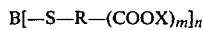

wherein B is the residue from the ring opening reaction of an epoxide group on the polyepoxide molecule and the sulfhydryl hydrogen and n is at least 1.

DETAILED DESCRIPTION OF THE INVENTION

Modified epoxy resins are prepared by reacting a polyepoxide with a compound containing a mercaptan group and at least one carboxyl group in the presence of a tin catalyst. Each of the components forming a part of the claimed process is described in detail in the following paragraphs.

The polyepoxide is any compound or mixture of compounds having a plurality of 1,2-epoxy groups, i.e., the compound has a 1,2-epoxy equivalency greater than 1.0. The preferred polyepoxides have a molecular weight of from about 150 to about 5,000. Examples of these polyepoxides have, for example, been described in U.S. Pat. Nos. 2,467,171; 2,615,007; 2,716,123; 3,030,336; 3,053,855 and 3,075,999; and *Handbook of Epoxy Resins*, Lee and Neville, 1967, McGraw-Hill Book Company.

A preferred class of polyepoxides are the polyglycidyl ethers of polyphenols, such as bisphenol-A. These are produced by etherification of a polyphenol with epichlorohydrin in the presence of an alkali. The phenolic compound can be 1,1-bis(4-hydroxyphenyl)ethane, 1,1-bis(4-hydroxyphenyl)isobutane, 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane, or the like. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, 2,2-bis(4-hydroxycyclohexyl)propane, and the like.

Cycloaliphatic epoxy resins can also be used. Such resins are prepared by epoxidation of unsaturated cyclic alkenes with organic peracids, e.g., peracetic acid.

Another useful class of polyepoxides are those containing oxyalkylene groups in the epoxy molecule. Such oxyalkylene groups are typically groups of the general formula:

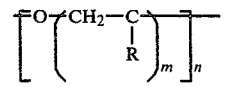

where R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

The mercaptan compound containing at least 1 carboxyl group has the structure HS—R—(COOX)$_m$ wherein R is an organic radical having from 1 to 10 carbon atoms, preferably 1 to 3 carbon atoms, X is hydrogen or a moiety formed by reacting the carboxylic group with a basic compound to form its salt and m is an integer of from 1 to 5, preferably from 1 to 3. Examples of basic compounds include alkali metal hydroxides and alkoxides, ammonia, amines, quaternary ammonium bases and mixtures thereof. R is preferably an aliphatic organic radical, though cyclic and alicyclic radicals are contemplated herein.

Illustrative of compounds represented by the aforementioned structural formula in which X is hydrogen include mercaptoacetic acid (thioglycolic acid), 2-mercaptopropionic acid (thiolactic acid), 3-mercaptopropionic acid, 2-mercaptosuccinic acid (thiomalic acid), 2-mercaptobenzoic acid (thiosalicyclic acid) and 4-mercaptobenzoic acid. Mercaptoacetic acid is preferred.

Other mercaptan compounds as above described are formed by reacting the carboxylic moiety of the mercaptocarboxylic acid with a suitable base. Suitable bases include ammonia, mono-, di-, and trialkyl amines, e.g., ethylamine, propylamine, dimethylamine, dibutylamine, and cyclohexylamine, mono-, di- and trialkanolamines, e.g., ethanolamine, diethanolamine, triethanolamine, propanolamine and butanolamine, and inorganic hydroxides, e.g., potassium and sodium hydroxide. The preferred amines are those of the structure

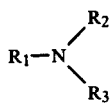

wherein $R_1$, $R_2$ and $R_3$ are alkyl or alkanol groups having 1 to 10 carbon atoms, preferably 1 to 3 carbon atoms. Preferred amines are triethanolamine, diethylethanolamine and ethyldiethanolamine.

The tin catalysts employed in the herein described process are the inorganic tin salts, e.g., stannous chloride, stannous fluoride and stannous sulfate and the tin salts of organic acids, e.g., tin naphthanate, tin benzoate, stannous octoate, tin butyrate, tin-2-ethylhexanate, dibutyl tin dioctoate, dibutyl tin diluarate, dibutyl tin diacetate and stannous octoate. The preferred tin catalysts are bibutyl tin dilaurate and stannous octoate. The amount of tin catalysts employed in the herein described process ranges from about 0.1 percent to about 5 percent based upon the polyepoxide solids content. The preferred range is from about 0.2 percent to about 2 percent.

It is not necessary to employ an organic solvent in the reaction process, although one is often used in order to afford better control of the reaction. The solvent used is non-reactive with the epoxy group. Useful solvents include ketones, dioxane, the mono- and dialkyl ethers of ethylene and propylene glycol, xylene and toluene. If desired, a coupling solvent can be added for improved film appearance. These solvents include hydrocarbons, alcohols, esters, ethers and ketones. Specific coupling solvents include isopropyl alcohol, butanol, isophorone, 4-methoxy-4-methyl-2-pentanone, ethylene and propylene glycol and 2-ethylhexanol.

The conditions under which the polyepoxide and mercaptan compound are reacted are dependent upon the specific components used. A temperature range of from about 20° C. to about 150° C. and a time of from about 30 minutes to about 24 hours, generally are sufficient for the reaction to occur. Preferably, reaction conditions of from about 60° C. to about 100° C. and from about 1 hour to about 4 hours are used.

The reaction can be depicted as follows:

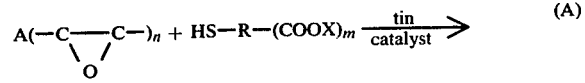 (A)

-continued $$B[-S-R-(COOX)_m]_n$$

wherein A is the organic radical portion of the polyepoxide, B is the residue from the ring opening reaction of the epoxide group on the polyepoxide and the sulfhydryl hydrogen, R, X and m are as defined previously and n is at least 1. Possible competing side reactions which would be expected to occur are the reaction of the epoxy group with the carboxyl group leading to esters or the reaction of the epoxy group with an amine carboxylate (if employed) leading to quaternary nitrogen-containing compounds. These side reactions (resulting in products undesired for the purposes herein contemplated) are depicted as follows:

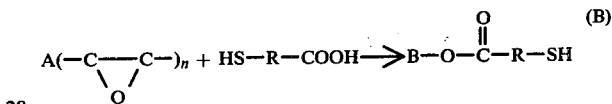 (B)

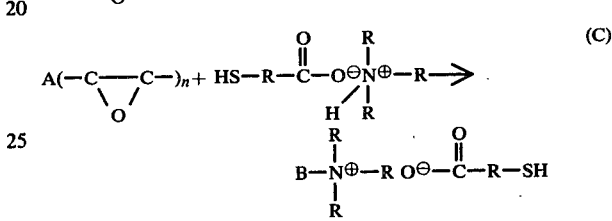 (C)

The above reactions are well-known in the art and would be expected to occur. However, surprisingly, neither reaction scheme (B) nor (C) occurs to any noticeable extent under the conditions of this invention. It is believed the presence of the tin catalyst is responsible for the selective reaction of the mercapto portion of the discussed mercaptan compound with the polyepoxide, i.e., reaction scheme (A). Other metal catalysts have not been found which will catalyze the selective reaction in the desired manner.

The value of n in the modified epoxy resin is at least 1. Its maximum value is less than or equal to the number of epoxide groups in the polyepoxide. The reactants are used at levels such that the equivalent ratio of epoxy groups contained in the polyepoxide to mercaptan groups contained in the mercaptan compound is from about 1.0:0.25 to about 1.0:1.25, preferably from about 1.0:0.5 to about 1.0:1.0.

It should be realized that the reaction of this invention can take place wherein X is hydrogen with the subsequent reaction products further reacted with a base compound so as to induce water solubility or water reducibility to the end products. Water solubilization or reducibility in this manner is well-known.

In some instances it can be desirable to prepare coating compositions in which the liquid medium is a mixture of water and organic solvents. This is accomplished by utilizing a water miscible or dispersible organic solvent such as, for example, an ether alcohol or a lower alkanol.

The modified epoxy resins herein produced are useful as such in coating compositions, particularly for the lining of food or beverage containers. However, the physical properties of the reaction product may be altered by reacting therewith an active hydrogen containing material such as an amine, alcohol, mercaptan, etc. Such reactions are well-known as are more fully described in the aforementioned U.S. Pat. No. 4,029,621 beginning in Column 6, line 64 and continuing through Column 11, line 31 (the disclosure of which is herein incorporated by reference).

The compositions herein ordinarily will contain other optional ingredients including pigments, various fillers, antioxidants, flow control agents, surfactants, etc. It is also generally preferred that the reaction products be combined with a suitable curing or crosslinking agent. Such materials include aminoplast resins, phenolic resins and blocked or semiblocked polyisocyanates. Such curing or crosslinking agents are well-known in the art.

The compositions are applied by any convenient coating method including brushing, spraying, dipping, flow coating, and electrodeposition. Moreover, the compositions can be applied over a variety of substrates including wood, metals, glass, cloth, plastics, wallboards, foams and the like.

The following examples are illustrative of the described invention. The end products resulting from the processes are the desired modified epoxy resins aforedescribed. The resins are especially useful for the interior coating of beverage containers.

EXAMPLE I

A five liter reactor vessel is equipped with heating means, stirrer, thermometer, reflux condenser and nitrogen inlet. One thousand, three hundred and twenty grams (1,320) of a polyglycidyl ether of bisphenol-A having a M.W. of 390 and epoxide equivalent of 195, (available from Shell Chemical Co. as EPON 829) and 680 grams of bisphenol-A are added to the reactor vessel. A nitrogen blanket is maintained throughout the reaction. The mixture is heated to 180° C. An exothermic reaction raises the temperature to 223° C. The mixture is then held at 170° C.–180° C. for one hour. Next 822 grams of ethylene glycol monobutyl ether is added while cooling the mixture to 85° C. Thirty-six (36) grams of stannous octoate is then stirred in for 20 minutes. Finally, 99.4 grams of 80 percent mercaptoacetic acid is added and allowed to react for 3 hours.

The final product has a solids content of 70.1 percent and contains 0.332 milliequivalents of acid per gram of sample, i.e., has an acid value of 18.6.

EXAMPLE II

To a five liter reaction vessel equipped as in Example I is added 1,140 grams of EPON 829, 360 grams of bisphenol-A and 235 grams of nonyl phenol. The mixture is heated to 180° C. under a nitrogen blanket, at which point it exotherms to 202° C. It is then held at 170° C.–180° C. for 1.5 hours. One thousand (1,000) grams of ethylene glycol monobutyl ether is next added while cooling to 75° C. Thirty (30) grams of stannous octoate is then added and stirred for 20 minutes. Thereafter, a salt prepared from 165.6 grams of 80 percent aqueous mercaptoacetic acid and 18.5 grams of diethylethanolamine is added and allowed to react for 3 hours.

The resultant product has a solids content of 60.9 percent and an acid value of 27.4.

EXAMPLE III

Into a five liter reactor equipped as described in Example I is charged 1000 grams of EPON 829 and 500 grams of bisphenol-A. This mixture is heated to 180° C. and held for 1.5 hours to prepare an epoxy resin of about 4,000 molecular weight. The resin is allowed to cool while adding 1,000 grams of ethylene glycol monobutyl ether. Once a temperature of 50° C. is reached, 15 grams of dibutyl tin dilaurate is added. Next a salt prepared from 81 grams of diethylethanolamine and 62.5 grams of mercaptoacetic acid is added. Stirring is continued for 75 minutes at which time the resin is poured out. The resulting product is found to be water-reducible and has the following properties:

| Solids content | 57.5 percent |
|---|---|
| Acid value | 14.0 |

EXAMPLE IV

Into a reactor equipped as in Example I is charged 2,000 grams of a polyepoxide having a melting point of 125° C.–135° C., average molecular weight of 4,500 and an epoxide equivalent of 2,000–2,500 (available from Shell Chemical Co. as EPON 1007) and 850 grams of ethylene glycol monobutyl ether. This mixture is heated to 135° C. over a period of 45 minutes in order to melt the resin. The mixture is then cooled to 50° C. over a period of three hours with stirring. At this time, 20 grams of dibutyltin dilaurate is added to the reactor and stirring is continued for 30 minutes. Following this addition, a salt prepared from 137.5 grams of triethanolamine and 82.7 grams of mercaptoacetic acid is added to the reaction mixture. Stirring is continued for an additional hour and then turned off. The reaction product is tested and found to be water-reducible.

The resultant resin product has the following properties:

| Solids content | 69.8 percent |
|---|---|
| Acid value | 15.5 |

EXAMPLE V

A five liter reactor vessel equipped as in Example I has added to it 660 grams of EPON 829 and 340 grams of bisphenol-A. A nitrogen blanket is maintained throughout the reaction. The mixture is heated to 180° C. An exothermic reaction raises the temperature to 202° C. The mixture is then held at 170° C.–180° C. for 1½ hours. Four hundred twenty-five (425) grams of ethylene glycol monobutyl ether is added while cooling the mixture to 75° C. Eight and a half (8.5) grams of stannous chloride is added to the mixture. Next, 49.7 grams of 80 percent mercaptoacetic acid and 25.3 grams of diethylethanolamine are added and allowed to react for 3 hours. Thirty (30) grams of a 30 percent hydrogen peroxide solution is now added to oxidize trace amounts of unreacted odor-causing compounds. After 30 minutes, 11.5 grams of dimethylethanolamine is added. After another 15 minutes, 1700 grams of deionized water is added and the heat removed.

The final product has a solids content of 31.0 percent and has an acid value of 7.57.

EXAMPLE VI

To a five liter reaction vessel equipped as in Example I is added 660 grams of EPON 829 grams bisphenol-A. The mixture is heated under a nitrogen blanket to 180° C. at which point it exotherms to 183° C. It is then held at 170° C.–180° C. for 1.5 hours. Four hundred and twenty-five (425) grams of ethylene glycol monobutyl ether is next added while cooling to 75° C. Twenty (20) grams of stannous octoate is then added and stirred for 20 minutes. Thereafter, a salt prepared from 55.0 grams of 80 percent aqueous mercaptoacetic acid and 60.6 grams of N,N-dimethyl-2-amino-2-methyl propanol is added and allowed to react for 4 hours. Finally, 2000 grams of deionized water and 50 grams of 6 percent hydrogen peroxide solution are added.

The resultant product has a solids content of 27.7 percent and an acid value of 7.24.

What is claimed is:

1. A process of making modified epoxy resins comprising reacting a polyepoxide having a 1,2-epoxy equivalency of greater than 1.0 with a mercaptan compound having the structure HS—R—(COOX)$_m$, wherein R is an organic radical having from 1 to 10 carbon atoms, X is hydrogen or a moiety formed by reacting the carboxylic acid with a basic compound to form its salt and m is an integer of from 1 to 5 wherein the equivalent ratio of epoxy groups in the polyepoxide to mercaptan groups is from about 1.0:0.25 to about 1.0:1.25, said process occurring in the presence of a tin catalyst so as to produce the modified epoxy resins resulting from the ring opening reaction of an epoxide group on the polyepoxide molecule and the sulfhydryl hydrogen.

2. The process of claim 1 wherein a level of tin catalyst of from about 0.1 percent to about 5 percent based on the polyepoxide solids is present.

3. The process of claim 2 wherein the tin catalyst is selected from the group consisting of stannous chloride, stannous fluoride, stannous sulfate, tin naphthanate, tin benzoate, stannous octoate, tin butyrate, tin-2-ethylhexanoate, dibutyl tin dioctoate, dibutyl tin dilaurate, dibutyl tin diacetate, stannous acetate and mixtures thereof.

4. The process of claim 3 wherein the tin catalyst is dibutyl tin dilaurate or stannous octoate.

5. The process of claim 3 wherein the equivalent ratio of epoxy groups contained in the polyepoxide to the mercaptan groups is from about 1.0:0.5 to about 1.0:1.0.

6. The process of claim 5 wherein the level of tin catalyst is from about 0.2 percent to about 2 percent.

7. The process of claim 5 wherein the polyepoxide is a polyglycidyl ether of a polyphenol.

8. The process of claim 7 wherein the mercaptan compound is mercaptoacetic acid.

9. The process of claim 1 wherein the mercaptan compound is prepared by neutralizing a mercapto acid having a structure HS—R—(COOH)$_m$ with a tertiary amine having the structure

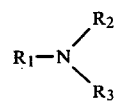

wherein R$_1$, R$_2$ and R$_3$ are alkyl groups or alkanol radicals having from 1 to 10 carbon atoms.

10. The process of claim 9 wherein the tertiary amine is triethanolamine, diethylethanolamine or ethyldiethanolamine.

11. The process of claim 1 wherein the reaction is carried out in the presence of an organic solvent.

12. The process of claim 5 wherein the reaction is carried out at a temperature of from about 20° C. to about 150° C. for from about 30 minutes to about 24 hours.

13. The process of claim 12 wherein the reaction is carried out at a temperature of from about 60° C. to about 100° C. for from about 1 hour to about 4 hours.

14. A process of making modified epoxy resins comprising reacting a polyepoxide having a 1,2-epoxy equivalency of greater than 1.0 with a mercaptan compound having the structure HS—R—(COOX)$_m$ wherein R is an organic radical having from 1 to 3 carbon atoms, X is hydrogen or a moiety formed by reacting the carboxylic group with a basic compound selected from the group consisting of alkali metal hydroxide and alkoxide, ammonia, amine, quaternary ammonium and mixtures thereof and m is an integer of from 1 to 5 in the presence of from about 0.1 percent to about 5 percent of a tin catalyst selected from the group consisting of dibutyl tin dilaurate, stannous octoate and mixtures thereof, and wherein the equivalent ratio of epoxy groups to mercaptan groups is from about 1.0:0.25 to about 1.0:1.25.

15. The process of claim 14 wherein the polyepoxide is a polyglycidyl ether of a polyphenol.

16. The process of claim 15 wherein the mercaptan compound is mercaptoacetic acid.

17. The process of claim 14 wherein the reaction is carried out at a temperature of from about 60° C. to about 100° C. and for from about 1 hour to about 4 hours.

* * * * *